(12) United States Patent
Khan et al.

(10) Patent No.: US 6,335,849 B1
(45) Date of Patent: ***Jan. 1, 2002

(54) LOW VOLTAGE, HIGH DISPLACEMENT MICROACTUATED DISK DRIVE SUSPENSION REFERENCE TO RELATED APPLICATIONS

(75) Inventors: Amanullah Khan; Shijin Mei, both of Temecula, CA (US)

(73) Assignee: Magnecomp Corporation, Temecula, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/777,519

(22) Filed: Feb. 5, 2001

Related U.S. Application Data

(63) Continuation of application No. 09/342,683, filed on Jun. 29, 1999, now Pat. No. 6,188,548, which is a continuation-in-part of application No. 09/207,286, filed on Dec. 8, 1998, now Pat. No. 6,134,087.
(60) Provisional application No. 60/088,731, filed on Jun. 10, 1998.

(51) Int. Cl.$^7$ .............................................. G11B 5/596
(52) U.S. Cl. .................................. 360/294.4; 360/294.6
(58) Field of Search ............................ 360/294.4, 294.6

(56) References Cited

U.S. PATENT DOCUMENTS

| 6,134,087 | A | * | 10/2000 | Khan et al. | 360/294.6 |
| 6,157,522 | A | * | 12/2000 | Murphy et al. | 360/294.6 |
| 6,188,548 | B1 | * | 2/2001 | Khan et al. | 360/294.4 |

* cited by examiner

*Primary Examiner*—Robert S. Tupper
(74) *Attorney, Agent, or Firm*—Louis J. Bachand

(57) ABSTRACT

A disk drive suspension comprising a load beam utilizing a piezoelectric microactuator has arcuate spring portion elements vertically to laterally disposed relative to the load beam that further curl or flatten in response to contraction or expansion of the piezoelectric microactuator to facilitate greater distance beam displacement at lower levels of voltage.

18 Claims, 4 Drawing Sheets

LOW VOLTAGE, HIGH DISPLACEMENT MICROACTUATED DISK DRIVE SUSPENSION REFERENCE TO RELATED APPLICATIONS

REFERENCE TO RELATED APPLICATIONS

This application is a continuation of U.S. Pat. application Ser. No. 09/342,683, filed Jun. 29, 1999, now U.S. Pat. No. 6,188,548, which is a continuation in part of U.S. Pat. application Ser. No. 09/207,286 filed Dec. 8, 1998, now U.S. Pat. No. 6,134,087 and further claims the benefit of U.S. Provisional Application Ser. No. 60/088,731, filed Jun. 10, 1998.

BACKGROUND OF THE INVENTION

1. Field of the Invention

This invention relates to disk drive suspensions and, more particularly, to load beams for disk drive suspensions. The invention suspensions utilize microactuation by a piezoelectric crystal to shift the load beam distal end relative to a disk to be read.

2. Related Art

Load beams are used to carry sliders containing read/write heads adjacent spinning disks. The load beam has a base portion anchored to an actuator arm that pivotally shifts the load beam and its associated slider angularly to move between tracks on the disk. The mass and inertia of conventional actuators means it requires considerable power to operate them.

SUMMARY OF THE INVENTION

It is an object of the present invention to provide an improved suspension. It is a further object to provide a load beam of novel design. It is a further object to provide for the actuation of a suspension load beam with microactuators acting against a beam spring portion having an expansion and contraction capability. It is a further object to utilize piezoelectric crystals acting between the load beam base potion and the beam portion across the spring portion under voltages of less than about 40 volts and achieving displacements of the load beam carried slider of about 2 micrometers in the Y-axis. It is a still further object to provide a load beam having specially conformed spring elements disposed from vertically to laterally the load beam to support the beam portion from the base portion but also to readily allow changes in dimension of the spring portion through the decrease or increase in an arcuate section of the spring elements.

The invention accordingly provides a disk drive suspension comprising a load beam extended along a longitudinal axis, the load beam having a base portion, a beam portion adapted to carry a slider in operating proximity to a disk, a spring portion connecting the base portion to the beam portion, and an electrodynamic microactuator coupled between the base and beam portions, the spring portion being elongatable and contractable in response to elongation or contraction of the microactuator, typically by the incorporation of arcuate sections along the length of the spring portion that increase or decrease their radius of curvature in response to elongation or contraction, respectively, of the microactuator.

In a particular aspect, the invention provides a disk drive suspension comprising a load beam having a base portion, a spring portion and a beam portion adapted to carry a slider in operating proximity to a disk, a dimensionally variable electrodynamic microactuator coupled to the base portion and the beam portion and across the spring portion in beam portion displacing shifting relation to the base portion over a distance that is a function of an applied voltage to the microactuator and the resistance of the spring portion to changes in dimension, the spring portion comprising a plurality of spring elements with local arcuate sections providing low resistance change in spring portion dimensions, whereby the beam portion is displaced an increased distance at a given applied voltage.

In this and like embodiments, typically, the suspension includes left and right hand microactuators acting on the beam portion in displacing relation, the microactuator comprises a piezoelectric crystal, and the applied voltage is less than about 40 volts, and the beam portion is displaced up to 2 micrometers in the Y-axis.

In a further embodiment, the invention provides a disk drive suspension comprising a load beam having a base portion, a spring portion and a beam portion adapted to carry a slider in operating proximity to a disk, a dimensionally variable piezoelectric crystal microactuator coupled to the base portion and the beam portion and across the spring portion in beam portion displacing relation to the base portion over a distance that is a function of an applied voltage to the microactuator and the resistance of the spring portion to changes in dimension, the spring portion comprising a plurality of spring elements with local arcuate sections providing low resistance change in spring portion dimensions, whereby the beam portion is displaced an increased distance shifting at a given applied voltage.

In this and like embodiments, typically, each spring element comprises a unitary part of a common web with the beam base portion and the beam portion, the spring element having fore and aft tabs connected to the beam and base portions respectively and an arcuate section connected to the fore and aft tabs in beam supporting relation relative to the base, the spring elements extending normal to said load beam and being generally parallel, separated and of like curvature in their arcuate sections, the spring portion comprises left and right spring elements, each spring element having an arcuate section intermediate the spring element ends, the arcuate sections tending to flatten to a greater radius curve when the spring portion element is elongated by action of the microactuator and to curl to a lesser radius curve when the spring portion element is contracted by action of the microactuator and individually for each spring element; the spring portion comprises left, right and center spring elements, each spring element having an arcuate section intermediate the spring element ends, the arcuate sections tending to flatten to a greater radius curve when the spring portion element is elongated by action of the microactuator and to curl to a lesser radius curve when the spring portion element is contracted by action of the microactuator and individually for each spring element; the spring element comprises a unitary part of a common web with the beam base portion and the beam beam portion, the spring element having fore and aft tabs connected to the beam and base portions respectively and an arcuate section connected to the fore and aft tabs in beam supporting relation relative to the base, the spring elements being generally parallel, separated and of like curvature in their arcuate sections.

In a further embodiment, typically, each spring element comprises a unitary part of a common web with the beam base portion and the beam portion, the spring element having fore and aft tabs connected to the beam and base portions respectively and an arcuate section connected to the fore and aft tabs in beam supporting relation relative to the base, the spring elements extending oppositely from the load beam and open to each other in a common plane including the load beam base and rigid portion, the arcuate sections being of like curvature in their arcuate sections, and the spring portion comprises left and right spring elements, each said spring element having an arcuate section intermediate the spring element ends, the arcuate sections tending to flatten to a greater radius curve when the spring portion element is elongated by action of the microactuator and to curl to a lesser radius curve when the spring portion element is contracted by action of the microactuator and individually for each spring element.

In each of the foregoing embodiments, typically, the microactuator comprises right and left piezoelectric crystals coupled between the base and beam portions inboard of the left and right spring elements; the applied voltage is less than 40 volts, the piezoelectric crystals are about 0.0075 inch in thickness, and the beam portion is displaced shifted up to 2 micrometers in the Y-axis.

BRIEF DESCRIPTION OF THE DRAWINGS

The invention will be further described as to certain illustrative embodiments in conjunction with the attached drawings in which.

DETAILED DESCRIPTION

The invention uses piezoelectric crystal material as a microactuator in a data recording head suspension. As noted above, conventional servo actuation is not effective when the disks have a high density of tracks-per-inch (TPI) such as about 25 to 30 KTPI since they are no longer able to follow the tracks for magnetic reading and writing. Further, the mass and inertia of the conventional actuator system requires considerable power to operate. In the invention the piezoelectric crystal is used as a microactuator variable member (motor) after being fastened to the base portion and the beam portion of the load beam, across the spring portion.

The position of piezoelectric element is optimized according to the off-track motion requirement (2 micrometers). The present, Underwriter's Laboratories' limitation in piezoelectric crystal material charging capacity ordains that the applied voltage should not exceed about 40 V (for single sheet piezoelectric material 0.0075 inch thick). As a consequence the physical change in dimension with an applied voltage, also called herein the excitation force, produced by the piezoelectric material has a limit determined by the limit on voltage input. The limit with conventional design load beams having inextensible spring portions is less than the desired 2 micrometers of Y-axis off-track motion, e.g. 1.5 micrometers or less.

In accordance with the invention, larger Y-axis, off-track motions are realized without exceeding the about 40 voltage limit on the crystals with a special design of load beam spring portion. Specifically the invention design provides a plural element load beam spring portion in which the elements have an arcuate section along their length that permits freer movement of the spring portion by the piezoelectric crystal microactuator. The freer movement uses less power to overcome spring portion resistance and more power is therefore available to shift the beam portion and slider farther, including up to the desired 2 micrometers. The invention achieves with its flexible arcuate sections in the spring portion elements this larger Y-axis off-track motion of the slider and recording head, although applying less than about 40 volts on the piezoelectric elements.

Figure 7:
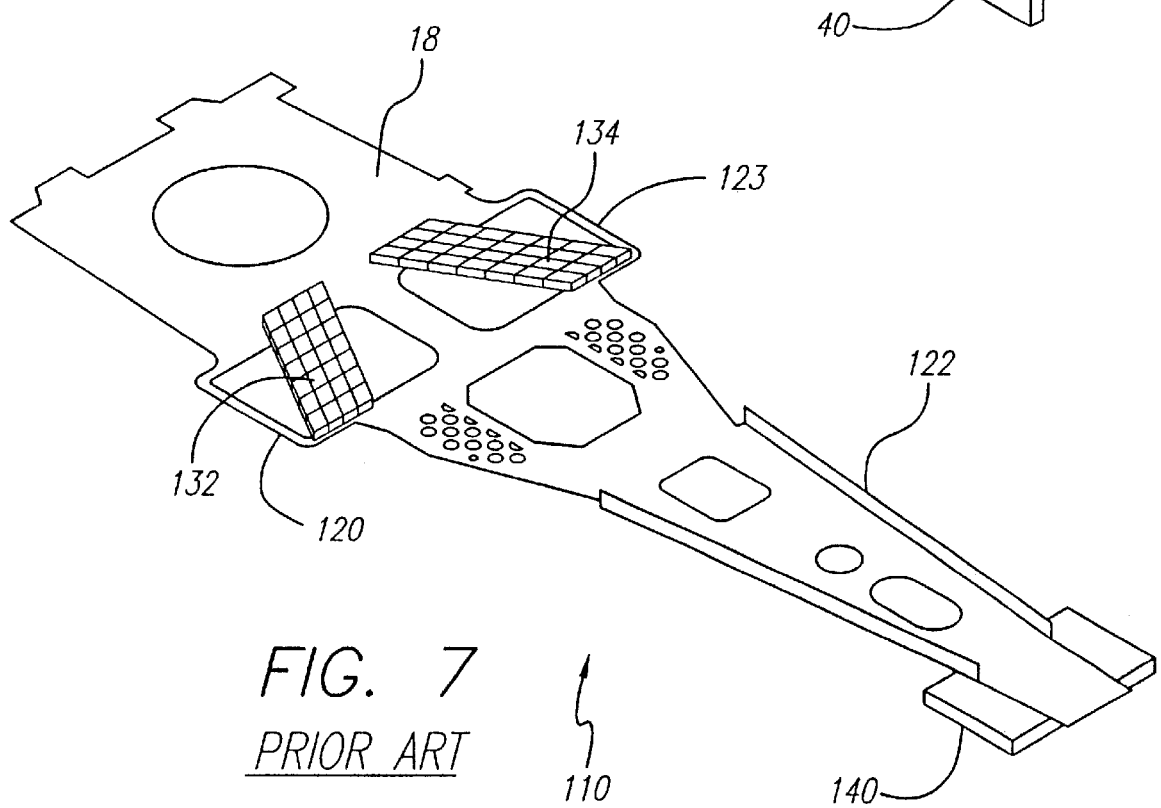
Figure 6:
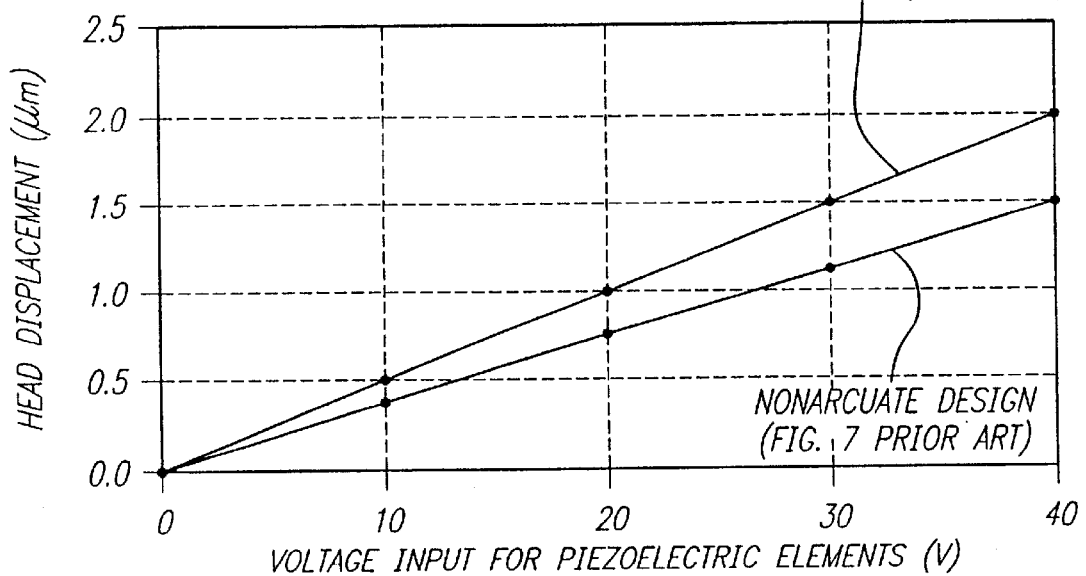
FIG. 6 is a graph depicting the difference in displacement of a load beam beam portion at 40 volts input into the microactuator for a nonarcuate vs. an arcuate spring portion; and, FIG. 7 is a (PRIOR ART) view of a nonarcuate spring portion load beam with microactuator.
Figure 5:
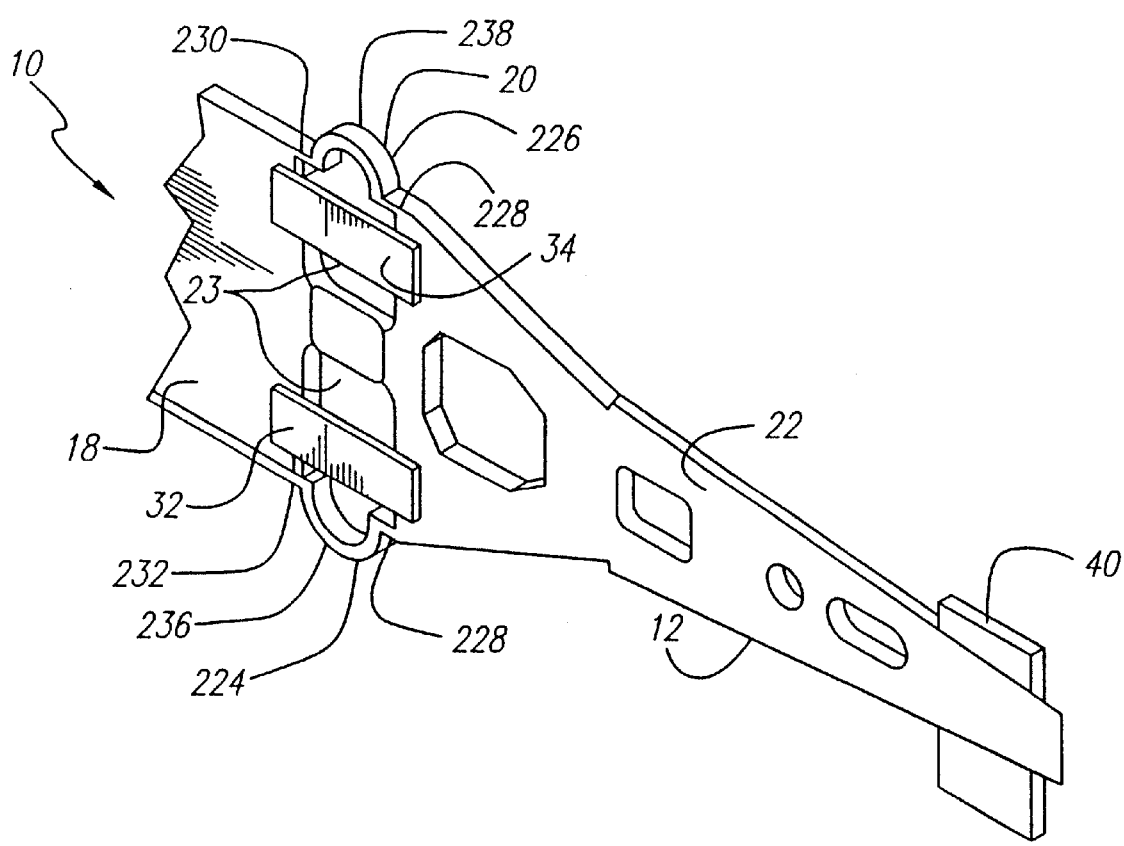
FIG. 5 is a perspective view of a further alternate embodiment comprising a two element spring portion load beam, the arcuate sections being disposed laterally of the load beam, at rest.

In FIG. 7 (PRIOR ART) the load beam 110 has a spring portion 120 that is flat and without arcuate sections. The piezoelectric elements 132, 134, are bonded to the load beam base portion 118 and to the beam portion 122 with suitable glue in a manner to bridge the and cross the two openings 123 in the spring portion, forming two bridges. Silver-filled epoxy or other conductive adhesive resin is used so that voltage or charge can be applied to the surfaces of the piezoelectric crystals. The piezoelectric elements 132, 134 will increase in dimension and thus give excitation force if a voltage is applied on the piezoelectric elements. In the load beam 110 form shown and with the piezoelectric elements 132, 134 mounted as shown in the Figure, their excitation force is not sufficient to both shift the slider 140 on the Y-axis and overcome the constraint imposed by the rigidly sized, dimensionally inflexible and fixed spring portion 120. As a result, the shifting or displacement effected by the reaction force between the piezoelectric element and the load beam is very small and cannot produce enough off-track motion at the slider 140 location with only 40 volts applied. A significant increase in voltage will move the load beam farther, but the crystals at the desired thickness of 0.0075 inch are not suited to receiving these higher voltages. In FIG. 5 the typical displacement or shifting of the slider at 40 volts with the FIG. 6 spring portion is shown; it is at about 1.5 micrometers and below the 2 micrometers desired.

The inventors have discovered that the problem posed by piezoelectric crystal electrical constraints on the one hand and load beam physical constraints on the other is solved by introducing dimensional flexibility to the load beam spring portion without reducing or altering its spring portion effectiveness by fabricating the spring portion elements to have arcuate sections. These sections while they support the load beam beam portion just as a conventional spring portion, e.g. 120, have the capability, separately and independently, to flatten or curl under elongating or contracting loads imposed by the crystal element mounted to the load beam.

The invention uses a plurality of spring potion elements, typically two or three, each with a "C-shape", that is an arcuate or "C-shaped" section is defined along the length of each spring element. The radius of the spring element arcuate sections can vary depending on the specific structure; their location is on either side of piezoelectric element in the load beam spring area. The arcuate section offers less constraint than that of flat, noncurved designs. With the elongation and compression of the piezoelectric element, the arcuate sections provide a physical conformation for the spring elements to extend or compress. With a small excitation force from the piezoelectric element, there is reconformation in the off-plane arcuate figures with less stress that involved in reshaping a conventional spring portion.

Figure 1:
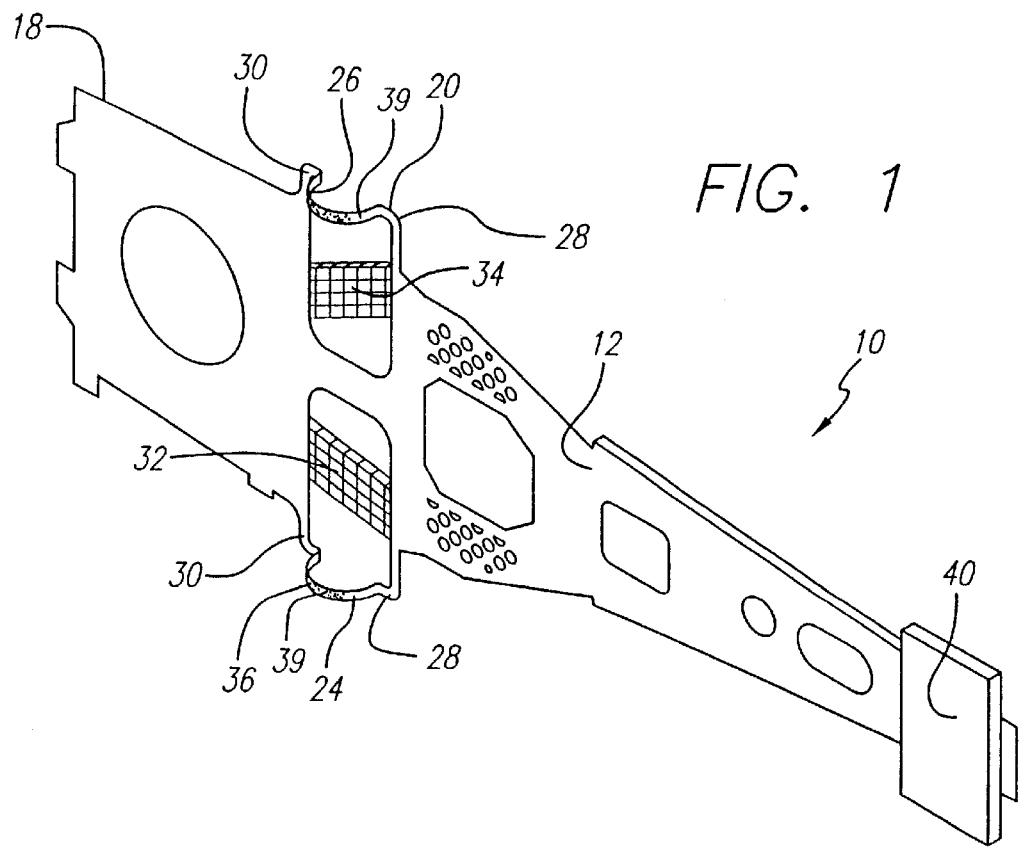
FIG. 1 is a perspective view of a two spring element spring portion load beam according to the invention, at rest.

The orientation of the arcuate sections can range from vertical to the load beam to lateral of the load beam, that is from 90° to 0° relative to the plane of the load beam; compare FIGS. 1 and 5.

Typically, the relationship between voltage input and off-track motion at the slider in the arcuate element design is better than that of flat design. The Y-axis displacement at the head is about 7.86 e-5 inch (2 micrometers). The maximum stress is low (6 kpsi) and far below the yield stress (185 kpsi). Further, the arcuate-sectioned spring portion load beam has a highly satisfactory sway mode frequency of 8.9 kHz.

Figure 2:
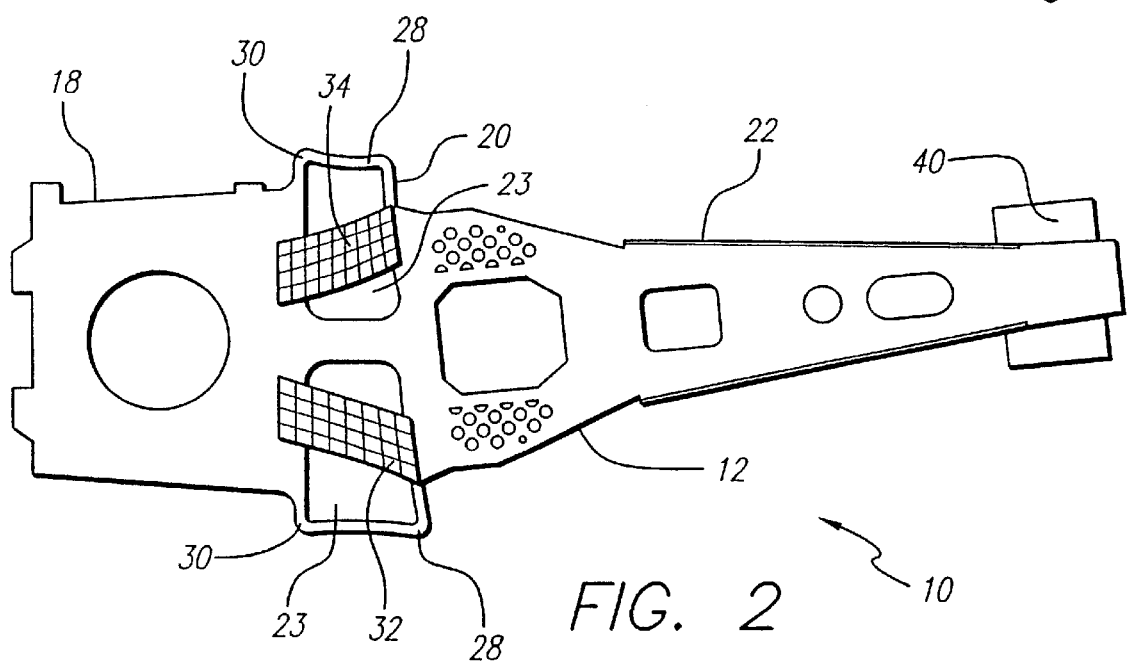
FIG. 2 is perspective view of the load beam of FIG. 1, with the microactuators operating to displace the beam portion.
Figure 4:
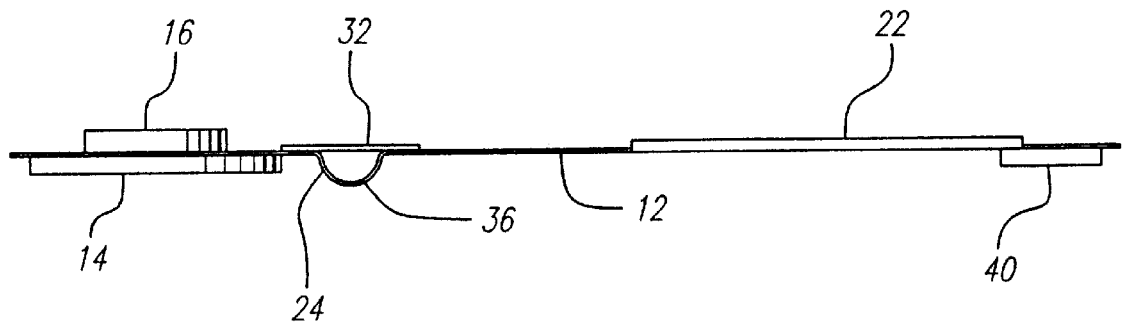
FIG. 4 is a side elevation view thereof.

With reference to the drawings in detail, in FIGS. 1 and 2 load beam 10 comprises a unitary web 12 of stainless steel or other suitable spring material supported by a mount plate 14 having a boss 16 (FIG. 4). Load beam 10 has a base portion 18, fixed on the mount plate boss 16, a spring portion 20 and a beam portion 22 carrying a slider 40. Electrodynamic microactuators in the form of piezoelectric crystals 32, 34 are bonded to the base portion 18 and the beam portion 22 with glue or by other means. The crystals 32, 34 are arranged to traverse the openings 23 in the spring portion 20 at an angle as shown relative to the longitudinal axis of the load beam 10. Crystals 32, 34 function independently to elongate or contract in response to a positive or negative voltage being applied, exerting a force on the immovable base portion 18 and the displaceable beam portion 22. The beam portion 22 is displaced in the Y-axis a distance that is a function of the applied voltage and the mechanical resistance of the beam spring portion 20 to bending to accommodate the beam portion displacement.

Spring portion 20 comprises left and right hand spring elements 24, 26. Spring elements 24, 26 are unitary with the web 12 and formed to have forward and rearward tabs 28, 30, and arcuate sections 36, 38 intermediate the length of the spring elements and connected to the base portion 18 and beam portion 22 by their respective tabs 28, 30. The arcuate sections 36, 38 are generally C-shaped, extend normal to the lateral plane of the spring portion 20 (see FIG. 4) and are open to that plane, see FIG. 1. Thusly conformed, the spring elements 24, 26 will lengthen or contract in response to relative movement between the base portion 18 and the beam portion 22. This accommodation of relative movement is the product of the radius of curvature of the arcuate spring elements 24, 26 changing. A displacement of the beam portion 22 by the elongation of the piezoelectric crystals 32, 34 will extend or contract the spring elements 24, 26 by changing their radius of curvature to larger (flatter) for an elongation of the crystals, or smaller (more curled) for a contraction of the crystals.

The change in curvature of the spring elements 24, 26 makes changes in the apparent length of these elements (measured as the distance between the base portion 18 and the beam portion 22 at the elements, as opposed to real length which is the length from end-to-end) a simple, nearly mechanical resistance-free step. In contrast to the forcing of real length changes in the spring portion, see spring portion 120 in FIG. 6, the FIGS. 1 and 2 embodiment simply changes the curvature of the arcuate sections 36, 38 without acting against the tensile strength of the metal web 12.

Figure 3:
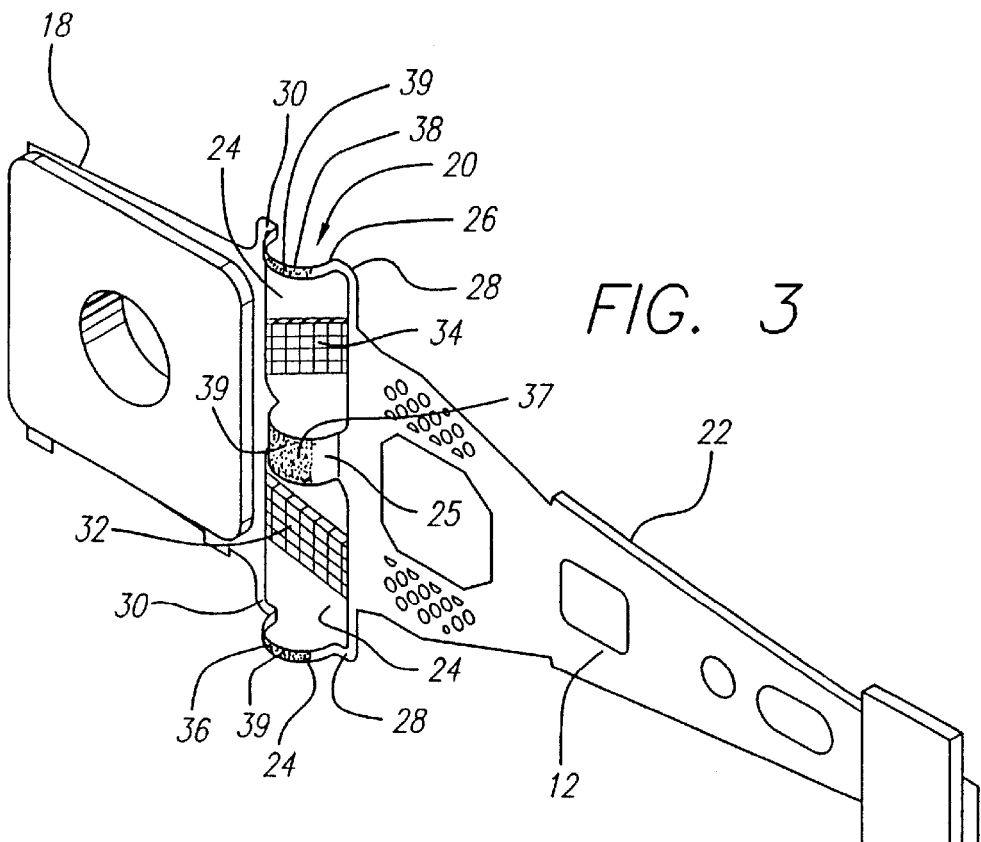
FIG. 3 is perspective view of an alternate embodiment comprising a three element spring portion load beam, at rest.

With reference to FIGS. 3 and 4, in which like numerals refer to like parts to FIGS. 1 and 2, a three spring element embodiment of the invention is shown. Load beam spring portion 20 comprises three spring elements: 24, 25 and 26, with the added spring element 25 being central to the load beam, disposed along the longitudinal axis thereof and between the left and right hand spring elements 24, 26. The functioning of the spring elements is as just described. Arcuate sections 36, 37 and 38 flex and change in curvature to accommodate displacement of the beam portion 22 by the dimensionally variable piezoelectric crystals 32, 34.

With reference to FIG. 5, in which like numerals refer to like parts to FIGS. 1 and 2, a laterally disposed spring element embodiment of the invention is shown. Load beam spring portion 20 comprises left and right-hand, laterally disposed spring elements 224, and 226 that, respectively, comprise arcuate sections 236, 238 and fore and aft tabs 228, 230 in beam portion 22 supporting relation relative to the base portion 18. The spring elements 224, 226 extend oppositely from the load beam 12 and are open on their load beam facing side to each other, as shown. Spring elements 224, 226 lie in a common plane that includes the load beam base 18 and beam or rigid portion 22. Arcuate sections 236, 238 are of like curvature.

The functioning of the FIG. 5 embodiment is as described for the FIGS. 1–4 embodiment. The FIG. 5 embodiment affords some advantages including enabling the suspension to be stiffer in the vertical direction and the same or less stiff in the sway direction. The piezoelectric crystal functions better when pushing against something that is not so stiffly resisting. Also, bending of the suspension in the areas of piezoelectric crystal attachment can cause breakage or detachment of the crystal due to the tremendous mechanical advantage between the beam distal end where the load is applied and the beam proximate end acting as a fulcrum near the mount plate. The crystal area is about one-fifth to one-eighth of the beam distance, so it sees a force of 5 to 8 times the load. This force is resisted by the crystal in bending and shear, and the crystal is stressed to either break or shear its adhesive bond to the beam. Stiffening the beam in the crystal area will reduce or eliminate this phenomenon. The laterally disposed spring elements 224, 226 are formed as rails opposite the crystal mounting, thereby stiffening the beam in this area. The beam then tends to bend in the in the spring area, as intended, rather than in the crystal area where bending is not wanted.

Further, a vertically disposed web, like spring elements 24, 26 in FIGS. 1–4, is softer in lateral stiffness than a horizontal web like that shown in FIG. 5. The difference in stiffness is approximately the cube of the relative lateral dimension. The FIG. 5 embodiment can offer a decrease in lateral stiffness and an increase in vertical stiffness because the spring element is folded to lie on its side (face to the edge of the load beam) as opposed to having its face facing the face of the load beam. For example, for a 0.008 wide element made from 0.0025 thick spring steel the improvement from the orientation change is 0.008/0.0025 or 32 times.

As noted above, the typical piezoelectric crystals used herein have a thickness of about 0.0075 inch and are able to receive applied charges of about +/− 40 volts. With reference to FIG. 5, the displacement of the beam portion 22, at the slider 40 area, is a function of the applied voltage and the mechanical resistance of the beam, particularly the beam spring portion 20, to displacement. More resistance means less displacement, other things being equal. This can be seen in comparing the displacement achieved with 40 applied volts with the invention arcuate-sectioned spring portion elements, upper line, and the flat inflexibly dimensioned spring portion 120 of FIG. 6, lower line. Displacement at 40 volts of the beam portion 22 of the invention arcuated load beam was the desired 2 micrometers, while the nonarcuated spring portion-provided load beam 110 (FIG. 6) achieved only 1.5 micrometers displacement at the same 40 volts being applied.

The invention thus provides and improved suspension in which actuation for displacement by a piezoelectric microactuator is realized to a greater extent from a given applied voltage by utilizing a load beam having specially conformed spring elements to support the beam portion but also to readily allow changes in dimension of the spring portion through the decrease or increase in an arcuate section of the spring elements. The foregoing objects are thus met.

We claim:

1. A disk drive suspension comprising a load beam having a base portion, a spring portion and a beam portion adapted to carry a slider in operating proximity to a disk, a dimensionally variable electrodynamic piezoelectric crystal microactuator coupled to said base portion and said beam portion in beam portion displacing relation to said base portion over a distance that is a function of an applied voltage to said microactuator and the resistance of said spring portion to changes in dimension, said spring portion comprising a plurality of spring elements with local arcuate sections providing low resistance change in spring portion dimensions, whereby said beam portion is displaced an increased distance at a given applied voltage.

2. The disk drive suspension according to claim 1, in which said suspension includes left and right hand piezoelectric crystal microactuators acting on said beam portion in displacing relation.

3. The disk drive suspension according to claim 1, in which said applied voltage is less than about 40 volts, and said beam portion is displaced up to 2 micrometers in the Y-axis.

4. The disk drive suspension according to claim 1, in which said spring portion spring elements further include a center spring element with a local arcuate section providing low resistance change in spring portion dimensions.

5. The disk drive according to claim 1, in which said spring portion comprises left and right spring elements, and said microactuator comprises a right and left piezoelectric crystals coupled between said base and beam portions inboard of said left and right spring elements.

6. The disk drive according to claim 1, in which said piezoelectric crystal is about 0.0075 inch in thickness, said applied voltage is less than 40 volts, and said beam portion is displaced up to 2 micrometers in the Y-axis.

7. A disk drive suspension comprising a load beam having a base portion, a spring portion and a beam portion adapted to carry a slider in operating proximity to a disk, a dimensionally variable piezoelectric crystal microactuator coupled to said base portion and said beam portion in beam portion displacing relation to said base portion over a distance that is a function of an applied voltage to said microactuator and the resistance of said spring portion to changes in dimension, said spring portion comprising a plurality of spring elements with local arcuate sections providing low resistance change in spring portion dimensions, whereby said beam portion is displaced an increased distance at a given applied voltage, each said spring element comprising a unitary part of a common web with said beam base portion and said beam portion, each said spring element having fore and aft tabs connected to said beam and base portions respectively and an arcuate section connected to said fore and aft tabs in beam supporting relation relative to said base, said spring elements extending normal to said load beam and being generally parallel, separated and of like curvature in their arcuate sections.

8. The disk drive suspension according to claim 7, in which said spring portion comprises left and right spring elements, each said spring element having an arcuate section intermediate the spring element ends, said arcuate sections tending to flatten to a greater radius curve when said spring portion element is elongated by action of said microactuator and to curl to a lesser radius curve when said spring portion element is contracted by action of said microactuator and individually for each spring element.

9. The disk drive according to claim 8, in which said microactuator comprises a right and left piezoelectric crystals coupled between said base and beam portions inboard of said left and right spring elements.

10. The disk drive according to claim 9, in which said piezoelectric crystal is about 0.0075 inch in thickness, said applied voltage is less than 40 volts, and said beam portion is displaced up to 2 micrometers in the Y-axis.

11. A disk drive suspension comprising a load beam having a base portion, a spring portion and a beam portion adapted to carry a slider in operating proximity to a disk, a dimensionally variable piezoelectric crystal microactuator coupled to said base portion and said beam portion in beam portion displacing relation to said base portion over a distance that is a function of an applied voltage to said microactuator and the resistance of said spring portion to changes in dimension, said spring portion comprising left and right spring elements, each said spring element having an arcuate section intermediate the spring element ends, said arcuate sections tending to flatten to a greater radius curve when said spring portion element is elongated by action of said microactuator and to curl to a lesser radius curve when said spring portion element is contracted by action of said microactuator and individually for each spring element.

12. The disk drive suspension according to claim 11, in which said spring portion comprises left, right and center spring elements, each said spring element having an arcuate section intermediate the spring element ends, said arcuate sections tending to flatten to a greater radius curve when said spring portion element is elongated by action of said microactuator and to curl to a lesser radius curve when said spring portion element is contracted by action of said microactuator and individually for each spring element.

13. The disk drive suspension according to claim 11, in which said piezoelectric crystal microactuator comprises a right and left piezoelectric crystals coupled between said base and beam portions inboard of said left and right spring elements.

14. The disk drive according to claim 13, in which said piezoelectric crystal in about 0.0075 inch in thickness, said applied voltage is less than 40 volts, and said beam portion is displaced up to 2 micrometers in the Y-axis.

15. A disk drive suspension comprising a load beam having a base portion, a spring portion and a beam portion adapted to carry a slider in operating proximity to a disk, a dimensionally variable piezoelectric crystal microactuator coupled to said base portion and said beam portion in beam portion displacing relation to said base portion over a distance that is a function of an applied voltage to said microactuator and the resistance of said spring portion to changes in dimension, said spring portion comprising a plurality of spring elements providing low resistance change in spring portion dimensions, each said spring element comprising a unitary part of a common web with said beam base portion and said beam portion, each said spring element having fore and aft tabs connected to said beam and base portions respectively and a spring element section having a straight length and fore and aft ends, said spring element section fore and aft ends being connected to said fore and aft tabs respectively in beam supporting relation relative to said base, each said spring element section having a local arcuate section intermediate the straight length of said spring element section and spaced from said fore and aft ends, said spring elements being open to each other and in a common plane, said arcuate sections being of like curvature, whereby said beam portion is displaced an increased distance at a given applied voltage.

16. The disk drive suspension according to claim 15, in which said spring element arcuate sections tend to flatten to a greater radius curve when said spring portion element is elongated by action of said microactuator and to curl to a lesser radius curve when said spring portion element is contracted by action of said microactuator and individually for each spring element.

17. The disk drive according to claim 16, in which said microactuator comprises a right and left piezoelectric crystals coupled between said base and beam portions inboard of said left and right spring elements.

18. The disk drive according to claim 16, in which said piezoelectric crystal is about 0.0075 inch in thickness, said applied voltage is less than 40 volts, and said beam portion is displaced up to 2 micrometers in the Y-axis.

* * * * *

UNITED STATES PATENT AND TRADEMARK OFFICE
CERTIFICATE OF CORRECTION

PATENT NO. : 6,335,849 B1  
DATED : January 1, 2002  
INVENTOR(S) : Khan, Mei

Page 1 of 1

It is certified that error appears in the above-identified patent and that said Letters Patent is hereby corrected as shown below:

<u>Title page, Item [54] and Column 1, lines 1 - 4,</u> should read -- LOW VOLTAGE HIGH DISPLACEMENT MICROACTUATED DISK DRIVE SUSPENSION --

Signed and Sealed this

Twenty-first Day of May, 2002

Attest:

JAMES E. ROGAN  
*Attesting Officer*       *Director of the United States Patent and Trademark Office*